US012574156B2

(12) United States Patent
Qian et al.

(10) Patent No.: US 12,574,156 B2
(45) Date of Patent: Mar. 10, 2026

(54) DYNAMICALLY CONFIGURING RETRY POLICIES OF NETWORK FUNCTIONS

(71) Applicant: Microsoft Technology Licensing, LLC, Redmond, WA (US)

(72) Inventors: Haibo Qian, Frisco, TX (US); Mark Gordon Libby, Groton, MA (US); Michael Anthony Brown, McKinney, TX (US); Ronald Mark Parker, Manchester, MA (US); Rahul Bose, Westford, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 526 days.

(21) Appl. No.: 18/087,457

(22) Filed: Dec. 22, 2022

(65) Prior Publication Data

US 2024/0214123 A1    Jun. 27, 2024

(51) Int. Cl.
*H04L 1/18* (2023.01)
*H04W 28/04* (2009.01)

(52) U.S. Cl.
CPC .............. *H04L 1/18* (2013.01); *H04W 28/04* (2013.01)

(58) Field of Classification Search
CPC ... H04L 1/18; H04L 43/0847; H04L 43/0829; H04L 47/12; H04L 47/263; H04W 28/04
See application file for complete search history.

(56) References Cited

U.S. PATENT DOCUMENTS

| | | | |
|---|---|---|---|
| 7,782,758 B2 | 8/2010 | Wydrowski | |
| 7,787,372 B2 | 8/2010 | Agarwal | |
| 10,470,077 B1 * | 11/2019 | Kodaypak | ............... H04W 4/14 |
| 11,368,380 B1 * | 6/2022 | Chraim | ............... H04L 43/0835 |
| 2013/0286835 A1 | 10/2013 | Plamondon | |
| 2014/0022908 A1 * | 1/2014 | Ibuki | ..................... H04L 1/1825 |
| | | | 370/236 |
| 2017/0303159 A1 * | 10/2017 | Ma | ......................... H04L 1/0001 |
| 2022/0346167 A1 * | 10/2022 | Cheong | ................. H04L 5/0053 |

OTHER PUBLICATIONS

International Search Report and Written Opinion received for PCT Application No. PCT/US23/035941, Feb. 27, 2024, 13 pages.
International Preliminary Report on Patentability (Chapter I) received for PCT Application No. PCT/US23/035941, mailed on Jul. 3, 2025, 8 pages.

* cited by examiner

*Primary Examiner* — Marcus Smith
*Assistant Examiner* — Raenita Ann Fenner
(74) *Attorney, Agent, or Firm* — Ray Quinney & Nebeker P.C.; James S. Bullough

(57) ABSTRACT

The present disclosure relates to systems, methods, and computer-readable media for configuring a network function in a core network of a telecommunications environment. For example, systems described herein involve collecting transmission data including timing and success/failure data for use in generating a retry policy that includes rules and instructions that govern transmission of retries between computing nodes. Once generated, the retry policy may be applied to message packages by selectively transmitting message retries based on specific timing delays that are determined from the collected transmission data. This generation and implementation of the retry policy may improve the latency and success rate of messages transmitted by computing nodes within a core network architecture, thereby improving network conditions in a variety of ways.

20 Claims, 9 Drawing Sheets

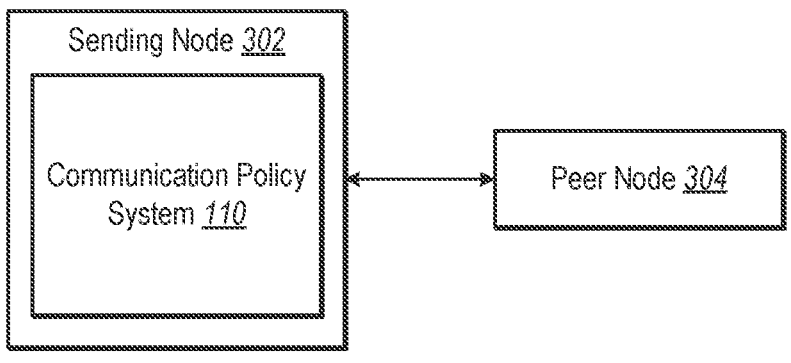
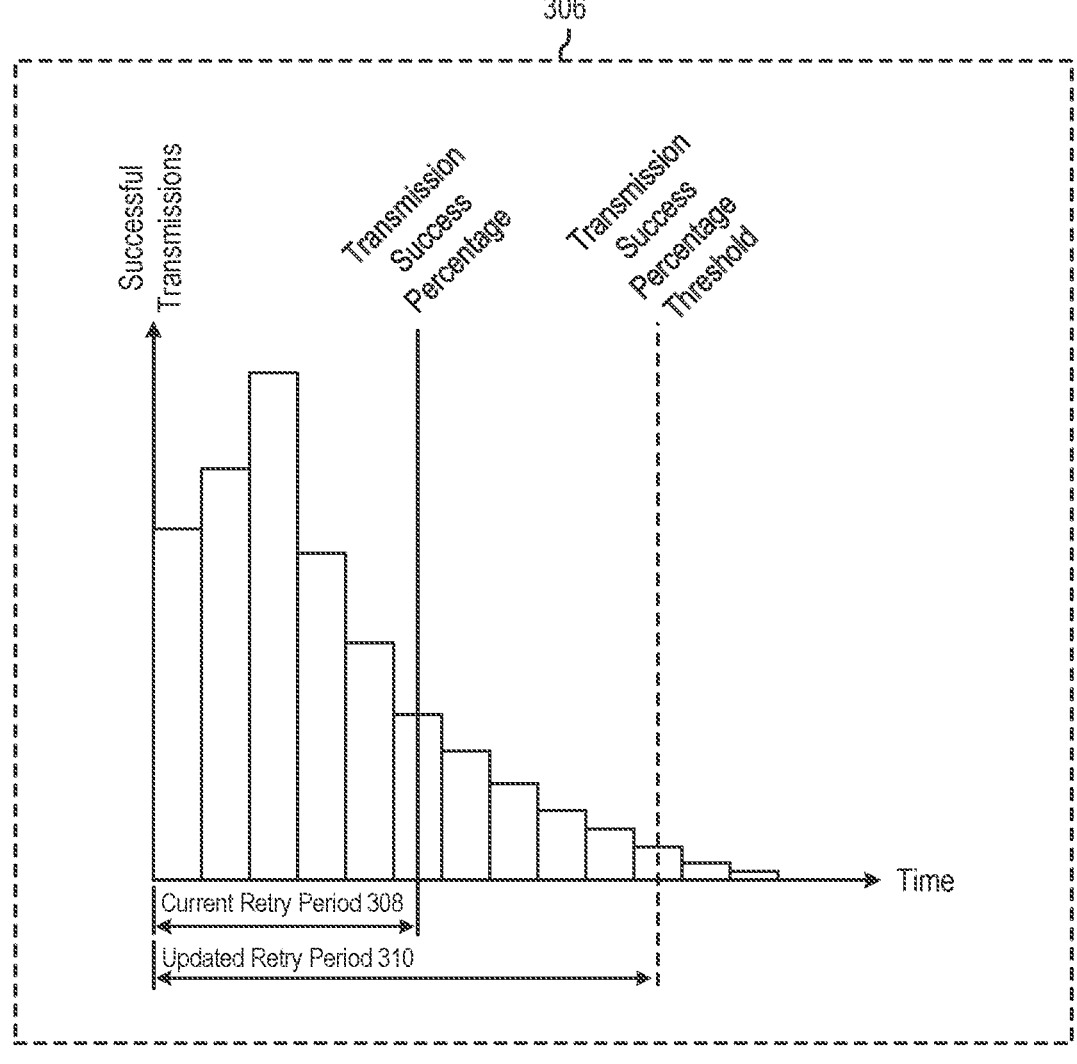
FIG. 3

600

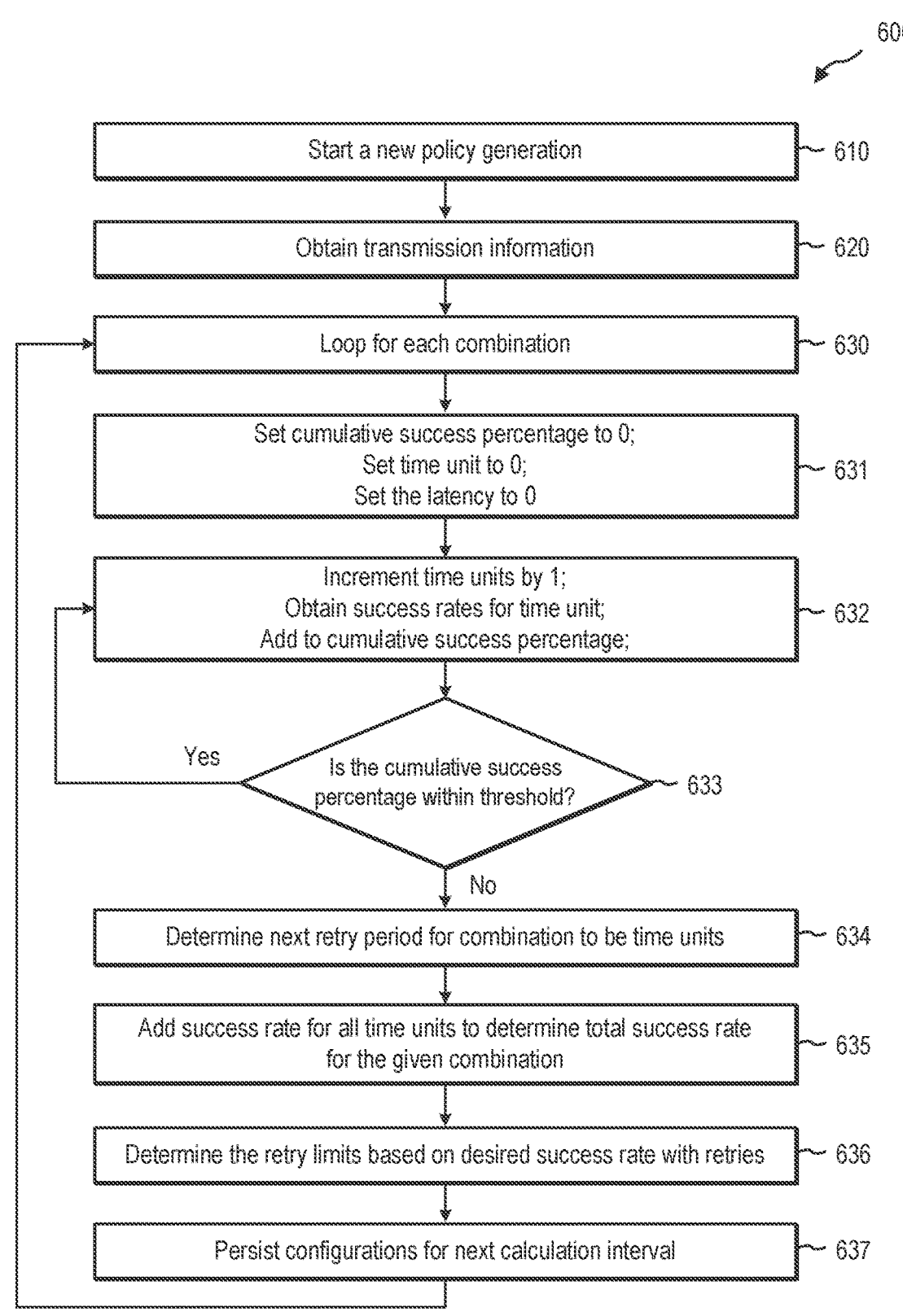

Start a new policy generation — 610

Obtain transmission information — 620

Loop for each combination — 630

Set cumulative success percentage to 0;
Set time unit to 0;
Set the latency to 0 — 631

Increment time units by 1;
Obtain success rates for time unit;
Add to cumulative success percentage; — 632

Yes

Is the cumulative success
percentage within threshold? — 633

No

Determine next retry period for combination to be time units — 634

Add success rate for all time units to determine total success rate
for the given combination — 635

Determine the retry limits based on desired success rate with retries — 636

Persist configurations for next calculation interval — 637

Identify a retry policy ~ 710

Obtain transmission information ~ 720

Determine transmission success percentage ~ 730

Determine updated retry period ~ 740

Apply updated retry period to retry policy ~ 750

DYNAMICALLY CONFIGURING RETRY POLICIES OF NETWORK FUNCTIONS

BACKGROUND

Cellular networks, such as fifth generation (5G) networks and other telecommunications networks, can provide computing devices (e.g., mobile devices) with access to services available from one or more data networks. A cellular network is typically distributed over geographical areas that include one or more base stations and core network devices that provide a cell with network coverage. The devices of the cellular network provide reliable access to a data network by mobile devices over a wide geographic area. In many instances these cellular networks provide mobile devices and other end-user devices access to the cloud.

As noted above, cellular networks include a number of network components. For example, cellular networks often include a radio access network (RAN) and a core network. The RAN may include base stations that communicate wirelessly with user devices (e.g., mobile devices) and facilitate interaction with components of a core network. The core network may provide access to services and data available from one or more external networks. As noted above, cellular networks are often used to provide Internet connectivity to mobile devices.

As will be discussed in further detail herein, a core network may provide a variety of functions, including providing Internet protocol (IP) connectivity for both data and voice services, ensuring this connectivity fulfills the promised QoS requirements, ensuring that user devices are properly authenticated, tracking user mobility to ensure uninterrupted service, and tracking subscriber usage for billing and charging.

As cellular networks have become more complex and more widespread, a number of difficulties have arisen in transmitting and processing messages between network devices. For instance, where network conditions often vary at different geographic locations and between different types of devices and services, messages or packets that are transmitted between network devices are often dropped or fail to be successfully delivered and processed from one device to another. As messages are often transmitted over multiple hops from a source device to a destination device, tracking successful delivery as well as ensuring that messages are delivered effectively can pose a number of challenges.

As an illustrative example, many network devices will send retry messages where a message is not successfully processed or delivered from one device to another. Conventional policies will often result in a significant number of retry messages being delivered without success. Conventional approaches to sending retry messages can cause significant problems, however, such as where network conditions are poor or where a significant number of retry messages are transmitted with no success. Indeed, this can cause an avalanche of retries that cascade over multiple network devices overloading network resources. Moreover, this will often result in a network having difficulty recovering from poor network conditions and prevent any number of client devices from successfully accessing network resources.

These and other problems exist in connection with implementing retry policies in a cellular network.

BRIEF DESCRIPTION OF THE DRAWINGS

FIG. 3 illustrates an example timeline and associated graph showing historical communication data between a sending node and a peer node of a cellular network in accordance with one or more embodiments.

FIG. 6 illustrates another example series of acts for determining and implementing an updated retry policy in accordance with one or more embodiments.

DETAILED DESCRIPTION

Figure 1:
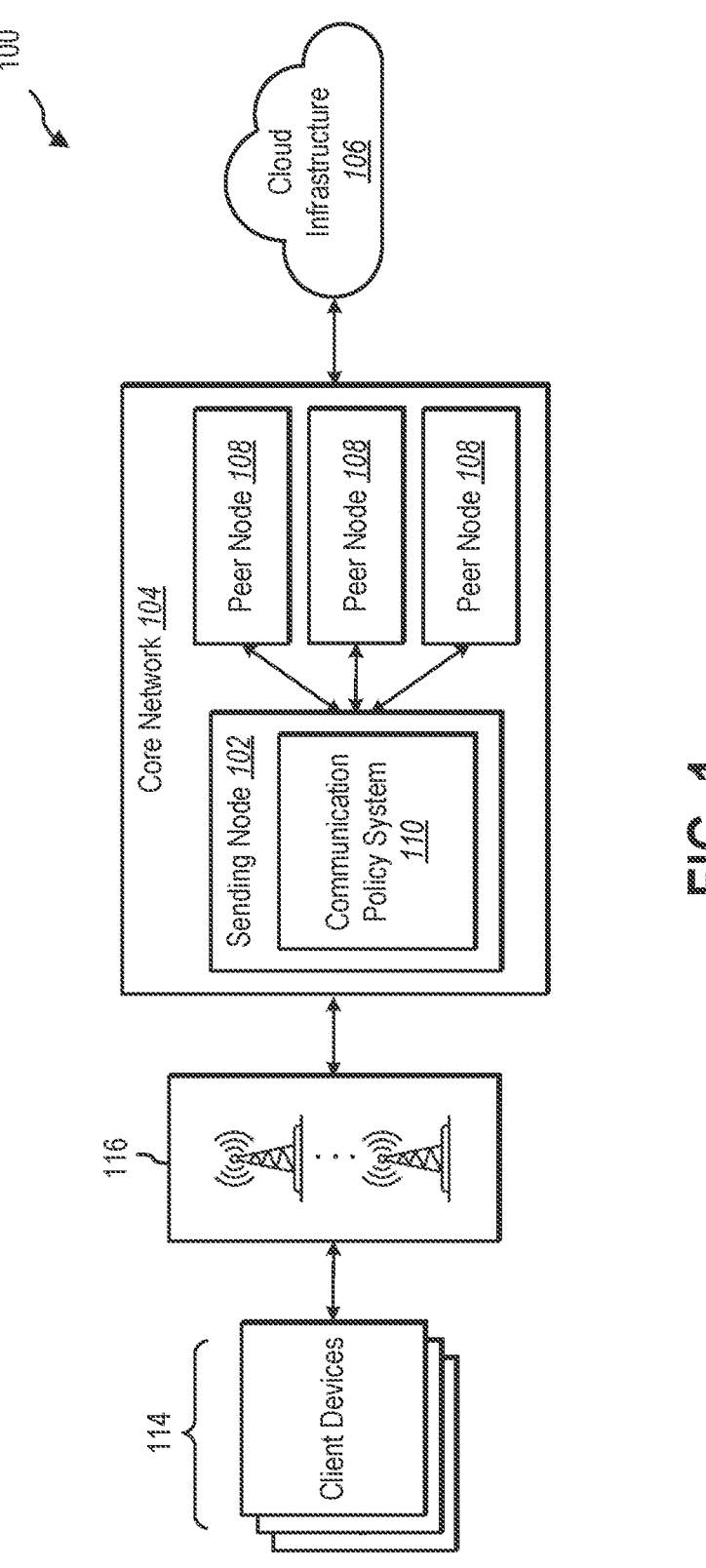
FIG. 1 illustrates an example environment including a communication policy system implemented within a cellular network in accordance with one or more embodiments.

The present disclosure relates generally to systems, methods, and computer-readable media for configuring network functions (e.g., computer nodes) in a cellular network environment (e.g., a core network telecommunications environment). In particular, the present disclosure involves determining an updated retry period for a retry policy implemented on a computing node. The retry period may be determined based on transmission data collected in association with communications of the computing node with one or more peer nodes. For example, the computing node may implement a communication policy manager to analyze the transmission data and determine whether a current retry period is facilitating the transmission of successful messages at certain threshold percentage. The communication policy system may accordingly determine an updated retry period corresponding to a time interval within which the threshold percentage of successful messages were transmitted. As will be discussed in further detail below, the communication policy system may determine one or more distinct retry periods for distinct peer nodes, for distinct message types, and/or for distinct peer node loading levels.

As an illustrative example, and as will be discussed in further detail below, a network function in a core network telecommunications environment may be configured with a retry policy. The retry policy may include a current retry period for sending retry messages to a sending node after a failed communication of a corresponding message. The sending node may obtain transmission data related to communications sent to a peer node including a transmission success percentage associated with the current retry period. Based on the transmission data, the sending node may determine that the transmission success percentage is less than a transmission success percentage threshold. Accordingly, the sending node may determine an updated retry period corresponding to a time interval in which communications are successfully transmitted at the success threshold. As will be discussed in further detail below, the sending node may apply the updated retry period to the retry policy for future communications transmitted by the sending node to the peer node.

As will be discussed in further detail below, the present disclosure includes a number of practical applications having features described herein that provide benefits and/or solve problems associated with transmitting messages and associated retry messages in a cellular network environment. Some example benefits are discussed herein in connection with various features and functionalities provided by a communication policy system implemented on one or more network functions. It will be appreciated that benefits explicitly discussed in connection with one or more embodiments described herein are provided by way of example and are not intended to be an exhaustive list of all possible benefits of the communication policy system(s).

For example, network functions often are deployed with default retry polices that are generic based on general performance of network devices across a cloud computing system. By implementing a network function that can dynamically update a retry policy based on observable metrics (e.g., real-time metrics) of the network, the network function can significantly improve its performance and/or the performance of other computing nodes. In addition, many conventional retry policies may be static and/or may require user input or modification in order to update. Implementing a network function that can actively and/or automatically update a retry policy can not only improve the performance of the network, but can significantly reduce the number of physical man-hours required to maintain and service the network.

In addition to generally tailoring retry policy updates to the capabilities of the network, by selectively determining and applying distinct retry periods for distinct peer nodes, the sending node can improve the latency and success rate of communications on a per-node basis. For example, some peer nodes may delay longer in responding than others, warranting longer retry periods. Conventional systems will often implement a retry period dictated by an average performance of all peer nodes, or even based on a worst-case scenario of the slowest peer nodes. This may result in slight improvements overall, but at the expense of capitalizing on the faster performance of more responsive peer nodes. By selectively tailoring retry periods for distinct peer nodes, each interface of the sending node can be optimized to ensure the fastest response time and best success rate for communications with each peer node. These improvements are multiplied when selectively implementing retry periods for different categories and/or subcategories of peer node interfaces (e.g., per message type, per loading level, etc.).

Further, by updating the retry policy of the sending node using the techniques discussed herein, retry messages can be more effective. By basing retry messages on a capability of a peer node to process and/or respond to a corresponding message, the processing expense on the respective nodes may be reduced. This may result in fewer retry messages sent, which can reduce consumption of bandwidth resources as a result of sending retry messages and improve general network conditions. Indeed, the retry policy may additionally include rules limiting the number of retries the sending node can send to a given peer node, which may be based on observations of the communications of the sending node with the peer node. This may reduce or eliminate needless and/or repeated retry messages being sent to unresponsive or underperforming peer nodes, which can reduce or lessen the risk of avalanches of retry messages monopolizing the network resources and causing cellular networks to underperform or go down unexpectedly.

In addition to the benefits discussed above, features and functionalities described herein can apply to a number of network environments and across a wide variety of computing nodes. For example, as will be discussed below, the communication policy system may be applied on computing nodes that are implemented within a variety of network architectures and which communicate using a variety of communication protocols. For instance, features and functionalities described in connection with one or more embodiments herein can apply to third generation (3G), fourth generation (4G), and fifth generation (5G) architectures and frameworks as well as any telecommunication frameworks (e.g., 5G and beyond) that use network functions having retry policies implemented thereon. In addition, features and functionalities described herein may be implemented on a wide variety of computing nodes on a cellular network. For instance, the communication policy system may be implemented on a gateway device, such as a packet data network (PDN) gateway, a serving gateway, a mobile management entity (MME), or any other computing node on a cellular network. In one or more embodiments, the communication policy system may be implemented on any computing node on a core network. For example, the communication policy system may be implemented in connection with on one or more network functions of a 5G telecommunications network, such as a session management function (SMF).

As illustrated in the foregoing discussion and as will be discussed in further detail herein, the present disclosure utilizes a variety of terms to describe features and advantages of methods and systems described herein. Some of these terms will be discussed in further detail below.

As used herein, a "computing node," "sending node," or "peer node" may refer to any device (e.g., a network device) implemented on a cellular network (or core network portion of a cellular network) that has a defined functionality that the device can offer to the overall network architecture. Each computing node may have a respective set of functions in the network architecture based on specific hardware as well as various functions and applications implemented thereon. Each of the computing nodes may be configured to receive and/or transmit a message to another computing node within the network architecture. Indeed, the computing node may refer to any computing node within the network architecture (e.g., any node within a core network).

As used herein, a "message" (or "communication," or "transmission") may refer to a data object or packet that contains data that may be transmitted between computing nodes. In one or more embodiments described herein, a message refers to a communication packet which contains information that is encoded in a specific protocol. As will be discussed herein, a message may be transmitted by a computing node to be received and/or processed by another computing node (e.g., a destination or receiving computing node).

As used herein, a "retry message" may refer to a message that is a copy of another message that was previously transmitted to another computing node. In one or more embodiments described herein, a retry message is generated and transmitted based on a detected or otherwise determined (e.g., predicted or confirmed) failure of a previously transmitted message. For instance, a retry message may be transmitted based on a period of time passing within which a reply to a message (or retry message) has not been received. In one or more embodiments described herein, a retry message is communicated based on a retry policy implemented on a corresponding computing device or based on a configuration applicable to a specific network function.

As used herein, a "message reply" or "reply" may refer to a message that is provided in response to receiving and/or processing a transmitted message. In one or more embodiments described herein each message may be configured to solicit a response. For example, a response may indicate a positive or negative receipt of the message and may contain information therein based on any information solicited from the original message. The content of the reply may differ based on how a computing node is responding (e.g., positive response, negative response).

As used herein, a "retry policy" refers to rules, settings, parameters, or any instructions associated with transmitting a retry message. For example, as will be discussed in further detail herein, a retry policy may include a retry period indicating a time interval after which a retry message should be sent following a failure to receive a reply message. In one or more embodiments, the retry policy may include a retry limit, or total number of retries that may be transmitted for a computing node or by a plurality of computing nodes within a network architecture. Indeed, the retry policy may include any information or instructions governing transmission of message retries by one or more computing nodes within a cellular network.

As used herein, a "timeout interval" may refer to a predetermined period of time after which a message is dropped if the message has not received a positive response (e.g., a response indicating successful receipt and processing of a message). A timeout interval may refer to a specific duration of time (e.g., 5-10 seconds). In one or more embodiments described herein, a timeout interval initiates from when a message is first transmitted.

As used herein, "transmission data" may refer to any data collected by a computing node in connection with messages and/or retry messages that have been transmitted by one or more computing nodes. In one or more embodiments described herein, transmission data refers to timing data associated with durations of time between sending messages and receiving message replies. The transmission data may further include failure data indicating the number of messages that were unsuccessfully delivered or which failed to be processed correctly. The transmission data may include a number or timing data for retry messages. In one or more embodiments described herein, transmission data refers to data collected over a calculation interval, or a predetermined period of time (e.g., over an hour of time).

As used herein, a "cloud computing system" or "cloud computing network" refers to a network of connected computing devices that provide various services to computing devices (e.g., customer devices). For instance, as mentioned above, a distributed computing system can include a collection of physical server devices (e.g., server nodes) organized in a hierarchical structure including clusters, computing zones, virtual local area networks (VLANs), racks, fault domains, etc. In one or more embodiments described herein a portion of the cellular network (e.g., a core network) may be implemented in whole or in part on a cloud computing system. Moreover, in one or more embodiments a data network may be implemented on the same or on a different cloud computing network as the portion of the cellular network.

Additional details will now be provided regarding systems described herein in relation to illustrative figures portraying example implementations. For example, FIG. 1 illustrates an example environment 100 for implementing features and functionality of a communication policy system on one or more computing nodes in accordance with examples described herein. For example, FIG. 1 illustrates an example environment 100, which may include components of a cellular network that enables client devices to communicate with and obtain access to data on a cloud infrastructure (e.g., an external data network).

As shown in FIG. 1, the environment 100 may include a core network 104. The core network 104 may include a sending node 102 and one or more peer nodes 108. The sending node 102 and the peer nodes 108 may each refer to a variety of network functions, computing nodes, devices, etc. having defined purposes within the architecture of the core network 104. The sending node 102 may have a communication policy system 110 implemented thereon. The sending node 102 may communicate with one or more peer nodes 108. As further shown, the cloud infrastructure 106 may be accessible to one or more client devices 114 by way of the core network 104 and, more specifically, by way of the sending node 102 and/or peer nodes 108. As further shown, the environment 100 may include mobile towers 116, or a network of base stations or mobile stations (e.g., a radio access network) capable of relaying messages and other communications between the client devices 114 and components of the core network 104.

As noted above, the sending node 102 and/or peer nodes 108 may each refer to a variety of computing nodes within a core network architecture. For example, a computing node may refer to gateway nodes, MME node(s) or any other computing node having applications or functions thereon that provide features and functionality within the framework of the core network 104. In one or more examples described herein, a computing node may refer to a PDN gateway that functions as a gateway to the Internet or data nodes of a data network. In one or more embodiments, a computing node may refer to a serving gateway that acts an anchor point for messages moving from one tower to another tower or from one node to another node within the core network 104. In one or more embodiments, the computing node may refer to an MME node, which interfaces directly with the mobile towers 116.

While the core network 104 and the cloud infrastructure 106 are illustrated as separate components, it should be understood the core network 104 and the cloud infrastructure 106 (and, in some cases, components of the radio access network including the mobile towers 116) may be implemented within a single cloud computing system. In one or more embodiments, the core network 104 and/or the cloud infrastructure 106 may be implemented across multiple cloud computing systems. For example, in one or more embodiments, components of the core network 104 are implemented on a first cloud computing system while some or all of the peer nodes 108 are implemented on an external network and/or on a second cloud computing system.

The client devices 114 may refer to a variety of computing devices including, by way of example, a mobile device such as a mobile telephone, a smartphone, a personal digital assistant (PDA), a tablet, or a laptop. Alternatively, one or more of the client devices 114 may refer to non-mobile devices such as a desktop computer, a server device (e.g., an edge network server), or other non-portable devices. In one or more embodiments, a client device may refer to an application or software construct on a computing device.

Each of the devices of the environment 100 may include features and functionality described generally below in connection with FIG. 8.

As shown in FIG. 1, one or more components of the environment 100 may be implemented within an architecture of a cellular network. For example, as noted above, a cellular network may include a radio access network inclusive of a network of mobile towers 116 in combination with components of a core network 104. Thus, as used herein, a cellular network may refer broadly to an architecture inclusive of the mobile towers 116 and the sending node 102 of the core network 104 while some implementations of the core network architecture may exclude the mobile towers 116. In one or more embodiments, features or functionalities of the radio access network may be implemented on the cloud computing system together with components of the core network 104 and/or cloud infrastructure 106 (e.g., as virtualized components on server node(s)).

As shown in FIG. 1, the sending node 102 may include a communication policy system 110 implemented thereon. As will be discussed in further detail below, the communication policy system 110 may collect transmission data for the sending node 102, for example, based on messages that are transmitted from the sending node 102, the communication policy system 110 may consider the transmission data in generating a retry policy.

One or more embodiments described herein may refer specifically to a retry policy generated based on transmission data collected by and analyzed on and for the sending node 102. Nevertheless, it will be appreciated that a plurality of computing nodes may be implemented on the core network 104, and the techniques described herein may be applied across many computing nodes, or selectively applied to individual computing nodes operating in the core network 104. For example, one or more of the peer nodes 108 may implement a communication policy system 110 as described herein and retry policies may be generated for each of the sending node 102 and one or more of the peer nodes 108.

Figure 2:
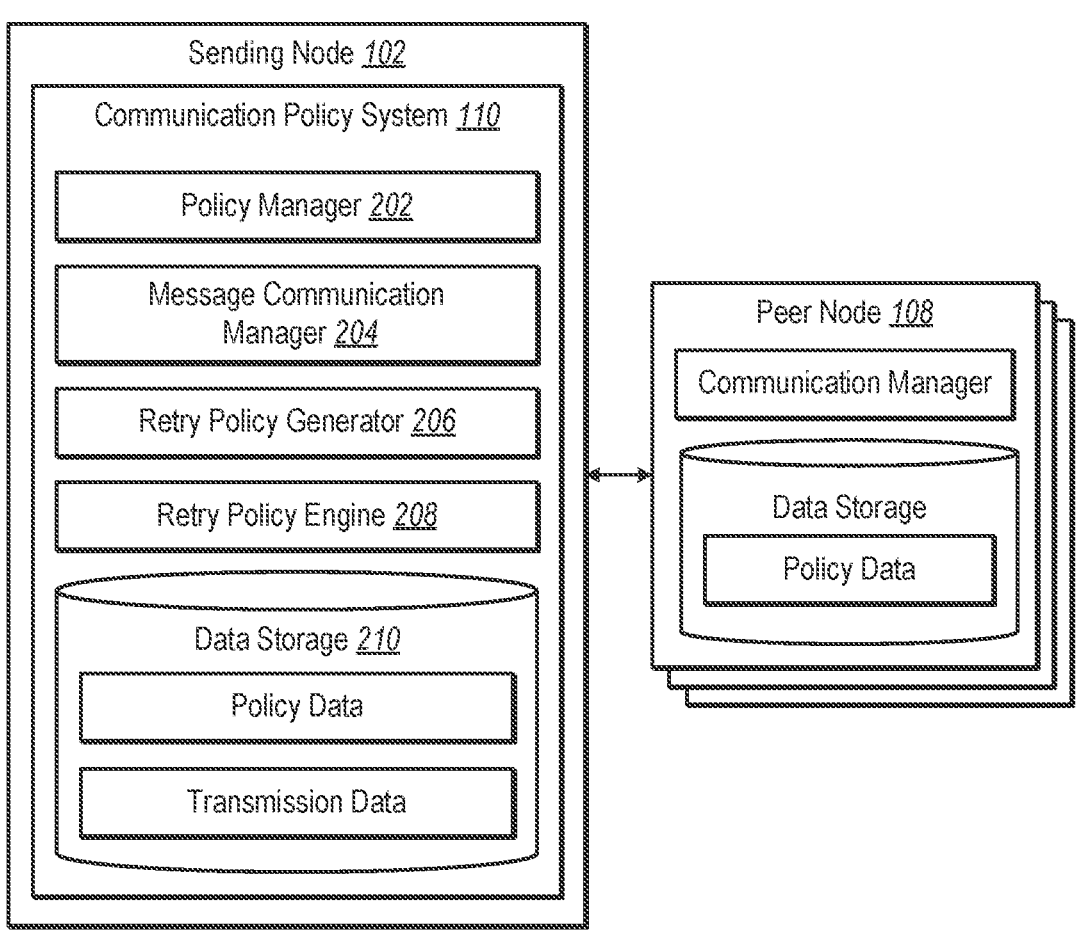
FIG. 2 illustrates an example computing node having a communication policy system implemented thereon in accordance with one or more embodiments.

Additional detail in connection with the communication policy system 110 will be discussed below in connection with an example sending node and peer nodes. For example, FIG. 2 illustrates an example sending node 102 having the communication policy system 110 implemented thereon. The sending node 102 may refer to any computing node having the communication policy system 110 thereon discussed above in connection with FIG. 1.

As shown in FIG. 2, the communication policy system 110 includes a policy manager 202, a message communication manager 204, a retry policy generator 206, and a retry policy engine 208. While one or more embodiments described herein describe features and functionalities performed by specific components 202-208 of the communication policy system, it will be appreciated that specific features described in connection with one component of the communication policy system 110 may, in some examples, be performed by one or more of the other components of the communication policy system 110.

By way of example, as will be discussed below, one or more features of the message communication manager 204 may be delegated to other components of the communication policy system 110. As another example, while implementation of a given policy may be performed by a retry policy engine 208, in some instances, some or all of these features may be performed by a policy manager 202 (or other component of the communication policy system 110). Indeed, it will be appreciated that some or all of the specific components may be combined into other components and specific functions may be performed by one or across multiple of the components 202-208 of the communication policy system 110.

As shown in FIG. 2, the communication policy system 110 includes a policy manager 202. In one or more embodiments, the policy manager 202 may identify and store policy data such as a retry policy including rules and instructions associated with the sending node 102 transmitting retry messages to the peer node 108. In one or more embodiments, the policy manager 202 identifies and stores or otherwise maintains a current or active retry policy. In one or more embodiments, the policy manager 202 may identify a retry policy including a retry period of the peer node 108.

In one or more embodiments, the policy manager 202 may determine policy data such as determining an initial retry policy for the sending node 102. For example, when the sending node 102 is initially deployed on the core network 104, the policy manager 202 may determine an initial retry policy to be implemented for the sending node 102 to begin its initial operation. In one or more embodiments, the policy manager 202 may identify a location of the sending node 102 and/or the peer node 108 (e.g., the physical location of the computing device implementing the node). As discussed herein, the policy manager 202 may identify a retry policy of the peer node 108. In one or more embodiments, the policy manager 202 may determine the initial retry policy for the sending node 102 based on one or more of the location of the sending node 102, the location of the peer node 108, or the retry policy of the peer node 108. For example, the policy manager 202 may identify that the sending node 102 and the peer node 108 are located on the same computing device, or computing devices located in the same server or data center. The policy manager 202 may accordingly determine an initial retry policy for the sending node 102 that includes a shorter period for sending retry messages to the peer node 108. In another example, the policy manager 202 may determine that the peer node 108 has a retry policy including a retry period of a given duration. The policy manager 202 may accordingly determine an initial retry policy for the sending node 102 that includes a retry period of at most the retry period of the peer node 108. In this way, the sending node 102 may be deployed with an initial retry policy determined by the policy manager 202.

As shown in FIG. 2, the communication policy system 110 may include a message communication manager 204. The message communication manager 204 may orchestrate or otherwise control communication (e.g., transmission and/or receipt) of messages to and from the sending node 102. For example, the message communication manager 204 may facilitate transmission of a message from the sending node 102 to a peer node 108 within a core network 104. As another example, the message communication manager 204 may facilitate transmission of retry messages from the sending node 102 to the peer node 108 in response to one or more observed retry conditions (e.g., failed transmission of a message, timeout of a message). In a further example, the message communication manager 204 may be configured to process or otherwise generate a response to an incoming message from the peer node 108. In one or more embodiments, the message communication manager 204 generates the messages prior to transmission. In one or more embodiments, the message communication manager 204 may generate one or more messages through one or more additional components of the communication policy system (e.g., the communication manager 204 may instruct another component or entity to generate and/or send a message) As discussed above, each message may include information soliciting a response from the peer node 108. Upon receiving a response, the message may be classified as or otherwise considered a successfully delivered message (or simply a "successful message"). Alternatively, where a response to a message is not processed or received (within a given time interval), the message may be classified as or otherwise considered an unsuccessful message, or a failed message. In one or more embodiments, the message communication manager 204 may determine whether a message is a successful message or an unsuccessful message.

In one or more embodiments, the message communication manager 204 may monitor and store transmission data related to communications of the sending node 102 and the peer node 108. For example, the message communication manager 204 may collect transmission data related to a loading of the peer node 108. In another example, the message communication manager 204 may collect transmission data related to communication latency of the peer node 108. In a further example, the message communication manager 204 may collect transmission data related to successful communications with the peer node 108.

As just mentioned, the message communication manager 204 may monitor and store transmission data related to a loading of the peer node 108. Loading of the peer node 108 may correspond to a current capability of the peer node 108 to process and/or respond to messages or requests. Loading of the peer node 108 may be related to a number of requests the peer node 108 is currently processing, a number of other computing nodes with which the peer node 108 is communicating, or simply a capability of the peer node 108 to process a volume of requests. For example, a peer node 108 may be communicating with a large number of other computing nodes resulting in slower processing and/or response times by the peer node 108. In one or more embodiments, the message communication manager 204 may obtain loading information of the peer node 108 through one or more resources native to the protocol of the network environment in which the computing nodes are being implemented. For example, in a 5G telecommunications environment, the communication manager 204 may obtain loading information of the peer node 108 from a network repository function (NRF). In another example, information regarding loading of the peer node 108 may be included in communications between the sending node 102 and the peer node 108. In one or more embodiments, the message communication manager 204 may independently determine loading information of the peer node 108. For example, the message communication manager 204 may calculate the loading information of the peer node 108 based on observed communications of the sending node 102 with the peer node 108. The message communication manager 204 may observe a message rate, message success rate, message latency, etc. of the peer node and calculate or estimate loading information of the peer node 108. In this way, the message communication manager 204 may collect transmission data that reflects the loading of a specific peer node 108.

As mentioned above, the message communication manager 204 may monitor and store transmission data related to communication latency of the peer node 108. For example, the sending node 102 may transmit a message to the peer node 108 and may successfully receive a response from the peer node 108. The message communication manager 204 may observe and store a latency associated with the successful message. The communication manager 204 may log latency information for a plurality of messages sent to the peer node 108. In one or more embodiments, the latency information may be based only on an initial message or request sent from the sending node 102. For example, the latency may correspond to an amount of time between the initial message from the sending node 102 and the successful response from the peer node 108. In one or more embodiments, the latency information may include or be based on retry messages sent from the sending node 102. For example, the latency may correspond to an amount of time between the latest retry message from the sending node 102 and the successful response from the peer node 108.

As discussed herein, a plurality of peer nodes 108 may be implemented on the core network 104, and the sending node 102 may communicate with any number of the peer nodes 108. In one or more embodiments, the message communication manager 204 may associate separate latency information with individual peer nodes of the peer nodes 108. In this way, the message communication manager 204 may categorize the transmission data on a per peer node basis.

In one or more embodiments, the message communication manager 204 may monitor and store latency information based on message type. For example, the message communication manager 204 may identify that the peer node 108 (or multiple peer nodes) delays longer in responding to messages or requests of a certain type. The message communication manager 204 may accordingly associate the slower latency with a specific type of message. In this way, the message communication manager 204 may categorize and/or subcategorize the transmission data on a per message type basis.

As discussed herein, the policy manager 202 may obtain loading information of the peer node 108. In one or more embodiments, the message communication manager 204 may monitor and store latency information based on the loading of the peer node 108. For example, the message communication manager 204 may identify that the peer node 108 delays longer in responding to messages when the load level of the peer node 108 is high. The message communication manager 204 may accordingly associate the slower latency with the higher loading level of the peer node 108.

In one or more embodiments, the communication manager 204 may categorize latency information based on any combination of the factors discussed above. For example, the latency information related to the sending node 102 may be categorized per peer node 108. In another example, the latency information corresponding to each peer node 108 may be further sub-categorized base on the message type transmitted to or from the peer node 108. In a further example, the sub-categorized latency information corresponding to message type may be further sub-categorized based on the loading level of the peer node 108. The latency information may be categorized and/or sub-categorized in any other combination or with regard to any other basis such that a wide variety of permutations of the factors discussed herein may be considered in evaluating transmission data for a corresponding peer node 108 or set of multiple peer nodes.

As mentioned above, the message communication manager 204 may collect and store transmission data related to successful and/or failed messages transmitted by the sending node 102. For example, the message communication manager 204 may maintain a record of a number of messages sent to and a number of responses received from the peer node 108. This may include retry messages, or alternatively, be based only on initial messages sent from the sending node 102. As will be discussed herein, the communication policy system may determine a packet loss rate, or a percentage of messages that are successfully delivered to the peer node 108. In one or more embodiments, the message communication manager 204 may identify a desired packet loss rate (e.g., a threshold loss rate). For example, the desired packet loss rate may be identified in the retry policy, such as from a user input. As noted above, the message communication manager 204 may determine successful or unsuccessful delivery of any of the messages based on whether the sending node 102 receives a response indicating successful delivery and processing of the message.

Similar to one or more embodiments discussed above in connection with the latency information, the message communication manager 204 may collect and store transmission data related to successful and/or failed messages on a per peer node basis, per message type basis, per loading level basis, any other basis, or combinations thereof. For example, the message communication manager 204 may identify a higher packet loss rate when loading of the peer node 108 is high, and a lower packet loss rate when loading of the peer node 108 is low. In another example, the message communication manager 204 may determine that a certain type of message has a higher probability of being successfully transmitted to the peer node 108 than a different type of message. In this way, the message communication manager 204 may categorize and/or sub-categorize transmission data related to successfully delivered messages based on a variety of metrics to provide a more accurate representation of the transmission success of the peer node 108 under varying circumstances.

In one or more embodiments, the message communication manager 204 may collect and store transmission data for a given interval of time. For example, the communication policy system 110 may periodically update, assess, or identify the retry policy for the sending node 102 at a calculation interval. In one or more embodiments, the message communication manager 204 may collect and store transmission data during that given calculation interval. In this way, the transmission data discussed above may be associated with a specific calculation interval for use in determining an updated retry policy as will be discussed herein.

As further shown in FIG. 2, the communication policy system 110 may include a retry policy generator 206. The retry policy generator 206 may generate rules, policies, or any instructions associated with sending retry messages subsequent to sending messages from the sending node 102. As an example, the retry policy generator 206 may indicate a rule to send a certain number of retry messages for a corresponding message. As another example, the retry policy generator 206 may indicate a rule to delay a certain amount of time, or a retry period, before sending one or more retry messages after failure of a corresponding message. As noted above, reducing the number of retries and/or tailoring the retry period can significantly reduce the expense of network resources caused by repeatedly transmitting redundant and/or ineffectively timed retries associated with the same message, as is often done in conventional systems.

As just mentioned, the retry policy generator 206 may determine or generate an updated retry period. As discussed above, the retry policy data may include a current or active retry period. The current retry period may be identified as part of either an initial retry policy determined by the policy manager 202, or an updated retry policy previously determined by the retry policy generator 206. The current retry period may be a retry period that has been implemented for the calculation interval discussed above, and the updated retry period may be a retry period that the retry policy generator 206 determines for implementation in a future, or subsequent calculation interval.

In one or more embodiments, the retry policy generator 206 may consider the transmission data to determine the updated retry period. For example, the retry policy generator 206 may consider the latency information for a specific peer node 108 to determine an updated retry period for sending retry messages to that peer node 108. In another example, the retry policy generator 206 may consider loading information for a specific peer node 108 to determine an updated retry period for sending retry messages to that peer node 108 under a specific loading.

As will be discussed further in connection with FIG. 3, the retry policy generator 206 may consider the transmission data to determine a transmission success percentage of messages sent to the peer node 108. For example, the retry policy generator 206 may determine that a subset or percentage of successful transmissions associated with the current retry period is below a desired, or a threshold percentage of successful transmissions. The retry policy generator 206 may accordingly determine an updated retry period associated with a subset or percentage of successful transmissions that are within the desired threshold. As discussed herein, the transmission data may be categorized and/or sub-categorized based on any number of bases.

The retry policy generator 206 may determine one or more updated retry periods associated with a peer node 108 based on one or more categorizations. For example, the retry policy generator 206 may determine an updated retry period for sending retry messages of a certain type to the peer node 108. In another example, the retry policy generator 206 may determine an updated retry period for sending retry messages of a certain type to the peer node 108 as a specific load level. In this way, the retry policy generator 206 may determine one or more updated retry periods associated with sending retry messages to the peer node 108 based on any number of categorizations and/or subcategorizations of the transmission data as discussed above.

As mentioned above, the retry policy generator 206 may determine or generate a retry limit, or a rule to send a certain number of retry messages from sending node 102 to the peer node 108. The retry policy generator 206 may consider the transmission data in determining the retry limit. For example, the retry policy generator 206 may determine a packet loss rate based on the record of messages sent to and responses received from the peer node 108. Put another way, the packet loss rate may correspond to a probability that a message will be successfully transmitted to the peer node 108.

In one or more embodiments, the retry policy generator 206 may consider the packet loss rate to determine the retry limit. For example, the retry policy generator 206 may identify a desired packet loss rate, and may formulate the retry limit based on the desired packet loss rate and the observed packet loss rate. In one or more embodiments, the retry limit may be inversely related to the probability of successful transmission based on the packet loss rate. For example, messages sent to the peer node 108 may have a higher probability of successful transmission (i.e., a low packet loss rate), and the retry policy generator 206 may therefore determine a lower retry limit. In another example, messages sent to the peer node 108 may have a lower probability of successful transmission (e.g., a high packet loss rate), and the retry policy generator 206 may therefore determine a higher retry limit. In one or more embodiments, the retry policy generator 206 may determine the retry limit based on the following formula:

$$\text{Retry Limit} = \lceil \log_{10}(1-\text{desired success rate})/\log_{10}(1-\text{total success rate}) \rceil - 1$$

where the desired success rate refers to a target rate of successful transmission of messages and a total success rate refers to an observed rate of successful transmission over some period of time. Additionally, the retry limit may be limited to a maximum number of retries allowed by a protocol of the network environment, a retry policy of the sending node 102, and/or a retry policy of the peer node 108. In this way, the retry policy generator 206 may determine a retry limit based on current observed metrics of communications with the peer node 108.

As discussed herein, the transmission data may be categorized and/or sub-categorized based on any number of bases. Similar to determining the retry period, the retry policy generator 206 may determine one or more retry limits associated with a peer node 108 based on one or more categorizations. For example, the retry policy generator 206 may determine a retry limit for sending retry messages of a certain type to the peer node 108. In another example, the retry policy generator 206 may determine retry limit for sending retry messages of a certain type to the peer node 108 as a specific load level. In this way, the retry policy generator 206 may determine one or more retry limits associated with sending retry messages to the peer node 108 based on any number of categorizations and/or subcategorizations of the transmission data as discussed above.

As discussed above, transmission data may be collected and stored for discrete calculation intervals corresponding to an interval during which a given retry policy is implemented. In one or more embodiments, the retry policy generator 206 may consider the transmission data for a given calculation interval to determine a retry period and/or retry limit for a future, or subsequent calculation interval. In one or more embodiments, the retry policy generator 206 may determine to continue implementing an updated retry period for future calculation intervals. For example, the retry policy generator 206 may determine an updated retry period and the communication policy system 110 may implement the updated retry period for a given calculation interval. After the calculation interval, the retry policy generator 206 may analyze the transmission data collected during the calculation interval and may determine that the updated retry period improved one or more parameters of the sending node 102. In response, the retry policy generator 206 may determine that the updated retry period should be implemented for future calculation intervals.

In one or more embodiments, the retry policy generator 206 may determine not to implement an updated retry period. For example, the retry policy generator 206 may analyze the transmission data for a given calculation interval and may determine that an updated retry period implemented during that calculation interval did not improve one or more parameters of the sending node 102. The retry policy generator 206 may accordingly determine that the updated retry period should not be implemented for future calculation intervals, and/or that a default, previous, or other retry period should be instead implemented in the retry policy. In this way, the retry policy generator may determine an updated retry period and/or a retry limit for improving one or more parameters of the sending node 102.

As shown in FIG. 2, the communication policy system 110 may include a retry policy engine 208. The retry policy engine 208 may apply the retry policy to future messages or future communications sent from the sending node 102. For example, the retry policy engine 208 may delay an amount of time corresponding to the retry period before sending a retry message, and/or may send a certain number of retry messages corresponding to the retry limit. As discussed herein, the retry policy engine 208 may apply the retry policy selectively to future communications based on the peer node 108 with which the sending node 102 is communicating, based on a message type, based on a loading level of the peer node 108, and combinations thereof. Indeed, the retry policy engine 208 may transmit a retry message in accordance with any of the rules indicated within the retry policy.

By applying the retry policy to the message(s), the retry policy engine 208 may provide a benefit of selectively transmitting retry messages at a particular point in time based on historical transmission data collected for a network, a sending node 102, and/or a peer node 108. For example, the retry policy engine 208 may apply a rule that is generated based on observed communications with the peer node 108 rather than a generic or static rule based on a user parameter or network-agnostic consideration. In addition, by selectively timing the sending of retry messages based on the network factors discussed above, the retry policy engine 208 may significantly improve the response time and processing expenses of networking resources on the core network 104.

As further shown in FIG. 2, the communication policy system 110 may include a data storage 210 including a variety of information maintained thereon. For example, as shown in FIG. 2, the data storage 210 may include, transmission data, and retry policy data.

As mentioned above, the data storage 210 may include retry policy data. The retry policy data may include any policies, rules, or instructions and associated data included within a retry policy of the sending node 102. In one or more embodiments, the retry policy data may include an initial retry policy generated by the policy manager 202. In one or more embodiments, the retry policy data may include a current or active retry policy generated or updated by the communication policy system 110, as will be discussed herein. The retry policy data may include retry policies associated with one or more peer nodes 108. The retry policy data may include an indicated retry period for sending retry messages from the sending node 102. The retry policy data may also include an indication of an amount of retry messages that should be sent from the sending node 102. Indeed, the retry policy data may include any information associated with any of the rules and policies described in accordance with one or more embodiments herein.

As shown in FIG. 2, the data storage 210 may include transmission data. The transmission data may refer to any of the transmission data discussed herein that is collected and stored related to sending and receiving messages. For example, the transmission data may include latency information associated with any number of peer nodes 108. In another example, the transmission data may include success/ failure information associated with any number of messages transmitted by the sending node 102. In yet another example, the transmission data may include loading information associated with any number of peer nodes 108. In one or more embodiments, the transmission data may include an indication of a number of retries and associated rate of success of transmitting the retry messages.

One or more components or features of the communication policy system 110 may access the information stored on the data storage 210. For example, the policy manager 202 and/or message communication manager 204 may access the data storage 210 to write to or store the policy data and/or transmission data. As will be discussed herein, other components or features of the communication policy system 110 may access the information stored on the data storage 210 in order to determine and/or implement an updated retry policy for the sending node 102.

Additional information will now be discussed in connection with an example environment in which a computing node collects transmission data and generates a retry policy in connection with one or more embodiments described herein. In particular, FIG. 3 illustrates an example environment 300 showing a sending node 302 having a communication policy system 110 implemented thereon. It will be understood that while FIG. 3 illustrates an example sending node 302 having the communication policy system 110 thereon, features discussed in connection with the example shown in FIG. 3 may apply to any other computing node on the core network 104 on which a retry policy can be implemented.

As noted above, the communication policy system 110 may facilitate transmitting any number of messages between the sending node 302 and a peer node 304. The peer node 304 may refer to any of the peer nodes 108 of the core network 104 as discussed above in connection with FIG. 1. As discussed above, each of the messages may include instructions that prompt a response from the peer node 304 upon receiving a message from the sending node 302.

In accordance with one or more embodiments described above, the communication policy system 110 may collect transmission data associated with a plurality of messages sent from the sending node 302 to the peer node 304. For example, the communication policy system 110 may collect and maintain success/failure data associated with a number of messages that are communicated from the sending node 302 to the peer node 304. The communication policy system 110 may collect and maintain latency or timing data associated with timing of when the messages were successfully communicated and processed. For example, the communication policy system 110 may collect timing data indicating durations of time between the sending node 302 sending the messages and receiving successful responses from the peer node 304. The communication policy system 110 may additionally collect and maintain loading information of the peer node 304 and associate the loading information with one or more of the latency data and/or the success/failure data mentioned above. The communication policy system 110 may further collect and maintain any of the transmission data mentioned above and categorize that data for a specific peer node 304, and/or a specific message type of a communication with a peer node 304. Indeed, the communication policy system 110 may maintain a record of the any type of transmission data related to the communications of the sending node 302.

As shown in FIG. 3, the communication policy system 110 may generate a transmission record 306 based on the transmission data. The transmission record 306 may represent timing data associated with each of the messages that were successfully transmitted by the sending node 302. As shown in FIG. 3, the transmission record 306 may be represented by a plot indicating a number of successfully transmitted messages with respect to time. For example, each bar on the plot represents a number of successfully transmitted messages within a corresponding unit of time. Accordingly, the transmission record represents the latency of each successfully transmitted message, and in this way the latency of specific percentiles of the aggregate total of successfully transmitted message.

As shown in FIG. 3, the transmission record 306 shows processing times for a plurality of successfully transmitted messages. As discussed above, the sending node 302 may implement a retry policy including a retry period 308 for sending retry messages to the peer node 304. In one or more embodiments, the communication policy system 110 may determine a transmission success percentage associated with the retry period 308. For example, the transmission success percentage may represent a percentage or a subset of successfully transmitted messages that occurred within the retry period 308. Put another way, the retry period 308 may capture a portion of all of the successfully transmitted messages, corresponding to the transmission success percentage.

In one or more embodiments, the communication policy system 110 may identify a transmission success percentage threshold. For example, the transmission success percentage threshold may be identified in the retry policy. In one or more embodiments, the transmission success percentage may be at least 99.9% of all successfully transmitted messages. As shown in FIG. 3, the communication policy system 110 may determine a portion (e.g., a percentage or ratio) of the successfully transmitted messages that fall within the transmission success percentage threshold. In one or more embodiments, an amount of time may be associated with the transmission success percentage threshold. Put another way, the communication policy system 110 may determine an amount of time that captures a portion of all of the successfully transmitted messages corresponding to the transmission success percentage threshold.

In one or more embodiments, the communication policy system 110 may determine that the transmission success percentage is less than the transmission success percentage threshold. Indeed, the communication policy system 110 may determine that the retry period captures less than the desired amount of successfully transmitted messages represented by the transmission success percentage threshold. In response, the communication policy system 110 may determine an updated retry period 310.

As shown in FIG. 3, the updated retry period 310 may correspond to the transmission success percentage threshold. For example, the updated retry period 310 may correspond to an amount of time that captures the desired amount of successfully transmitted messages represented by the transmission success percentage threshold. As discussed above, the communication policy system 110 may implement the updated retry period 310 in an updated retry policy for the sending node 302. In this way, transmission record 306 may be representative of the communication policy system 110 analyzing the transmission data to determine the updated retry period 310.

As discussed above, the transmission record has been described primarily as representing a retry period 308 that captures less than the desired amount of successfully transmitted messages (e.g., a transmission success percentage being less than a transmission success percentage threshold). It should be appreciated that the communication policy system 110 as described herein may determine an updated retry period 310 corresponding to the transmission success percentage threshold based on any transmission record 306 produced for any transmission data. For example, as described above, the communication policy system 110 may determine that the current retry period 308 is too short, or that the current retry period 308 is capturing less than the desired amount of successfully transmitted messages. The communication policy system 110 may accordingly determine an updated retry period 310 of a greater duration than the current retry period 308. In another example, the communication policy system 110 may determine that the current retry period 308 is too long, or that the current retry period 308 is capturing more than the desired amount of successfully transmitted messages. The communication policy system 110 may accordingly determine an updated retry period 310 of a shorter duration than the current retry period 308. In this way, the communication policy system 110 may determine the updated retry period 310 based on the transmission success percentage being approximately different than the transmission success percentage threshold.

As noted above, the communication policy system 110 may generate a retry policy based on the transmission data observed from the messages transmitted by the sending node 302 and the peer node 304. Upon generating the retry policy, the communication policy system 110 may cause the retry policy to be implemented on the sending node 302 in connection with subsequent messages generated and transmitted by the sending node 302. In one or more embodiments, the communication policy system 110 may distribute the retry policy to one or more additional computing nodes. The computing nodes may then execute or otherwise implement the retry policy locally on the respective device(s). For example, the communication policy system 110 may determine a retry policy for sending retry messages to the peer node 304 based on communications of the sending node 302 with the peer node 302. The sending node 302 may distribute the retry policy to one or more additional computing nodes that may be actively communicating or anticipating communication with the peer node 302. In this way, the updated retry policy may be shared with other computing nodes to prevent additional processing expenses of determining a retry policy associated with the peer node 304.

Figure 4A:
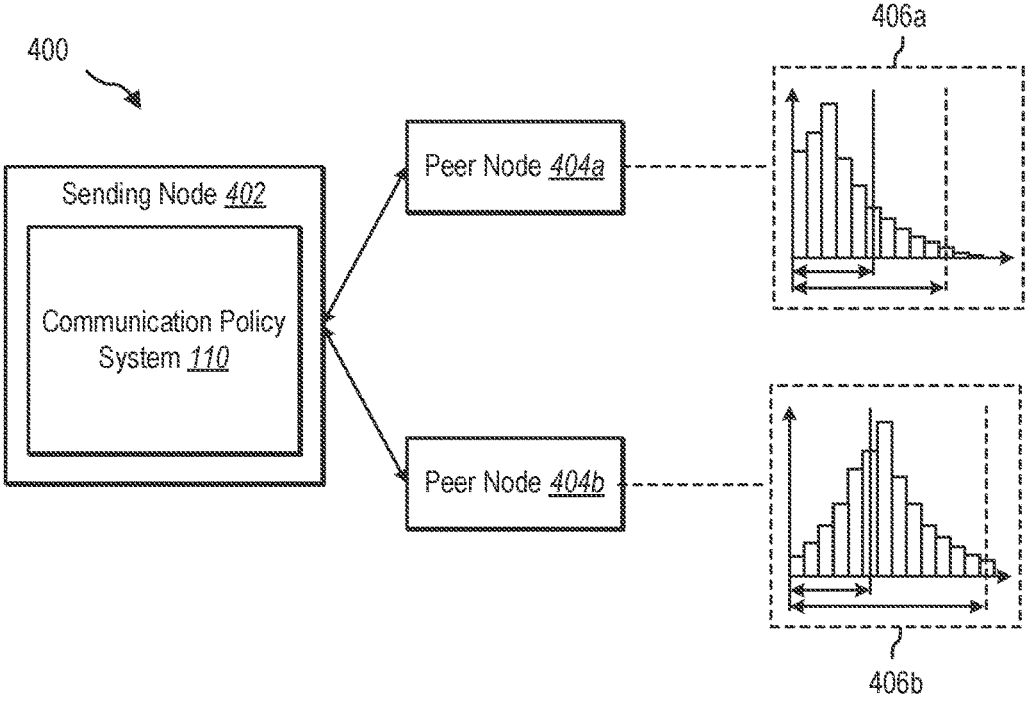
FIG. 4A illustrates an example timeline and associated graph showing historical communication data between a sending node and first and second peer nodes of a cellular network in accordance with one or more embodiments.

Additional details will now be discussed in connection with transmitting and responding to messages between two computing nodes. For example, FIG. 4A illustrates an example environment 400 showing a sending node 402 having a communication policy system 110 implemented thereon. As shown in FIG. 4A, the sending node 402 is in communication with a first peer node 404a and a second peer node 404b.

As discussed above, the communication policy system 110 may collect and store transmission data and/or policy data. In one or more embodiments, the transmission data and/or policy data may be categorized for a given peer node. For example, the communication policy system 110 may collect and/or categorize separate transmission data associated with communications with the first peer node 404a and may collect and/or categorize separate transmission data associated with communications with the second peer node 404b. Based on the separate transmission data, the communication policy system 110 may produce a first transmission record 406a corresponding to the first peer node 404a and a second transmission record 406b corresponding to the second peer node 404b. Using the techniques discussed above in connection with FIG. 3, the communication policy system 110 may consider the first transmission record 406a to determine a first updated retry period for sending retry messages to the first peer node 404a, and may consider the second transmission record 406b to determine a second updated retry period for sending retry messages to the second peer node 404b. In this way, the sending node 402 may implement any number of retry periods for communicating with any number of peer nodes.

Figure 4B:
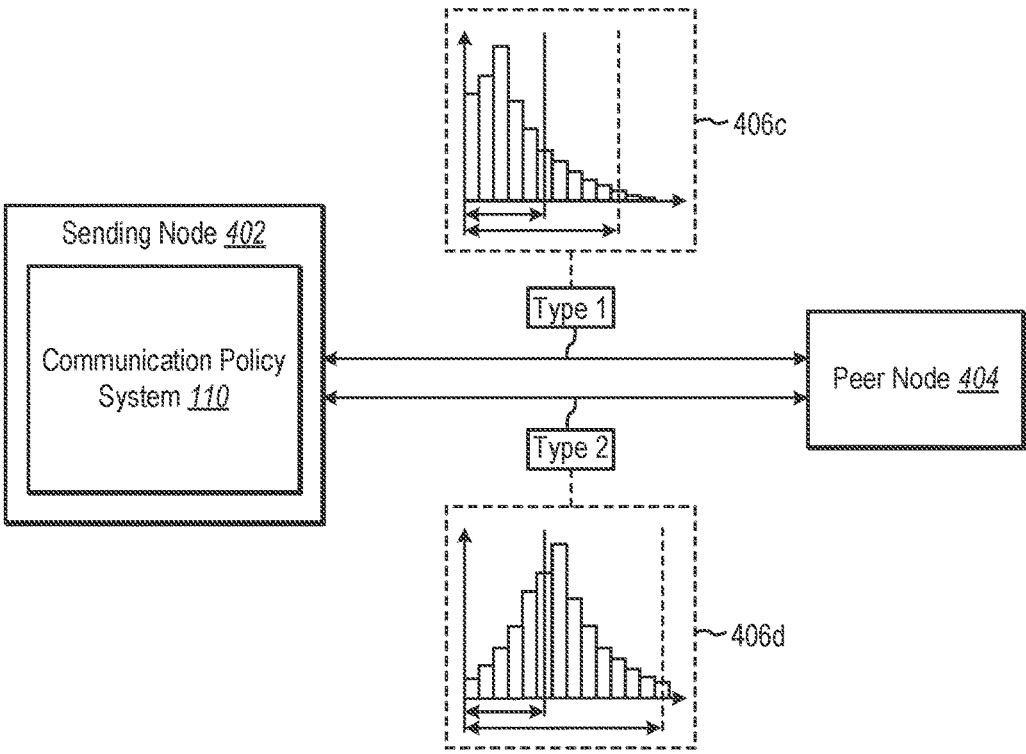
FIG. 4B illustrates an example timeline and associated graph showing historical communication data for communications of a first message type and a second message type between a sending node and a peer node in accordance with one or more embodiments.

FIG. 4B illustrates an example environment 400 showing a sending node 402 having a communication policy system 110 implemented thereon. As shown in FIG. 4B, the sending node 402 is in communication with a peer node 404 through messages of a first type and messages of a second type.

As discussed above, the communication policy system 110 may collect and store transmission data and/or policy data. In one or more embodiments, the transmission data and/or policy data may be categorized for a given message type. For example, the communication policy system 110 may collect and/or categorize separate transmission data associated with communications of the first type with the peer node 404 and may collect and/or categorize separate transmission data associated with communications of the second type with the peer node 404. Based on the separate transmission data, the communication policy system 110 may produce a first transmission record 406c corresponding to the first message type and a second transmission record 406d corresponding to the second message type. Using the techniques discussed above in connection with FIG. 3, the communication policy system 110 may consider the first transmission record 406c to determine a first updated retry period for sending retry messages of the first type to the peer node 404 and may consider the second transmission record 406d to determine a second updated retry period for sending retry messages of the second type to the peer node 404. In this way, the sending node 402 may implement any number of retry periods for communicating any number of message types to the peer node 404.

Figure 4C:
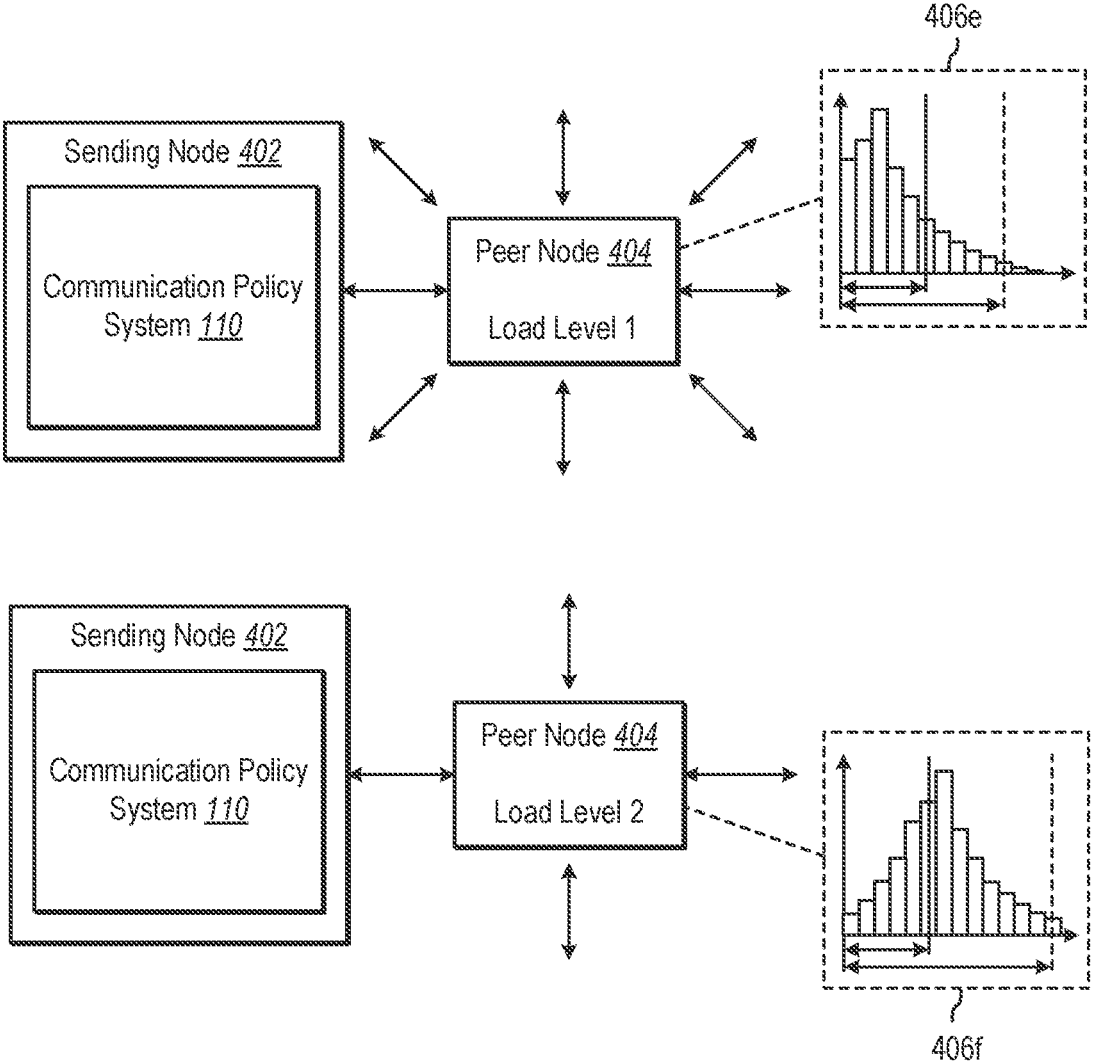
FIG. 4C illustrates an example timeline and associated graph showing historical communication data between a sending node and a peer nodes at a first loading level and at a second loading level in accordance with one or more embodiments.

FIG. 4C illustrates an example environment 400 showing a sending node 402 having a communication policy system 110 implemented thereon. FIG. 4C shows the sending node 402 in communication with a peer node 404 at a first loading level, and the same sending node 402 in communication with the same peer node 404 at a second loading level.

As discussed above, the communication policy system 110 may collect and store transmission data and/or policy data. In one or more embodiments, the communication policy system 110 may collect transmission data indicating a loading level of a peer node. As shown in FIG. 4C, the peer node 404 at the first loading level has a higher loading level than the peer node 404 at the second loading level. For example, the peer node at 404 may be more procedurally burdened at the first loading level than at the second loading level. In one or more embodiments, the transmission data and/or policy data may be categorized for a given loading level of the peer node. For example, the communication policy system 110 may collect and/or categorize separate transmission data associated with communications with the peer node 404 at the first loading level and may collect and/or categorize separate transmission data associated with communications with the peer node 404 at the second loading level. Based on the separate transmission data, the communication policy system 110 may produce a first transmission record 406e corresponding to the first loading level of the peer node 404 and may produce a second transmission record 406f corresponding to the second loading level of the peer node 404. Using the techniques discussed above in connection with FIG. 3, the communication policy system 110 may consider the first transmission record 406e to determine a first updated retry period for sending retry messages to the peer node 404 at the first loading level and may consider the second transmission record 406f to determine a second updated retry period for sending retry messages to the peer node 404 at the second loading level. In this way, the sending node 402 may implement any number of retry periods for communicating with the peer node at any number of loading levels.

FIGS. 4A to 4C have each been primarily described with respect to one functionality, or more specifically, one categorization of retry policies related to one categorization of transmission data (e.g., per peer, per message type, per load level). As described herein, the communication policy system 110 may collect, store, and categorize transmission data corresponding to any number of bases, including the per peer basis, per message type basis, and per loading level basis described in FIGS. 4A to 4C. It should be appreciated, that any number of alternative bases may used to categorize the transmission data and/or determine retry policies for such categories, as well as combinations thereof. For example, the communication policy system 110 may collect and categorize separate transmission data for distinct peer nodes as described in FIG. 4A while also collecting and categorizing separate transmission data for distinct message types as described in FIG. 4B. The communication policy system 110 may combine and/or subcategorize the separate transmission data such that, for example, the transmission data is subcategorized for distinct message types corresponding to each distinct peer node. The communication policy system 110 may accordingly determine and implement distinct updated retry periods for each category and/or subcategory. It should be appreciated that alternative categories/subcategories and combinations thereof may be envisioned to tailor communications of the sending node to peer nodes based on varying network conditions.

Figure 5:
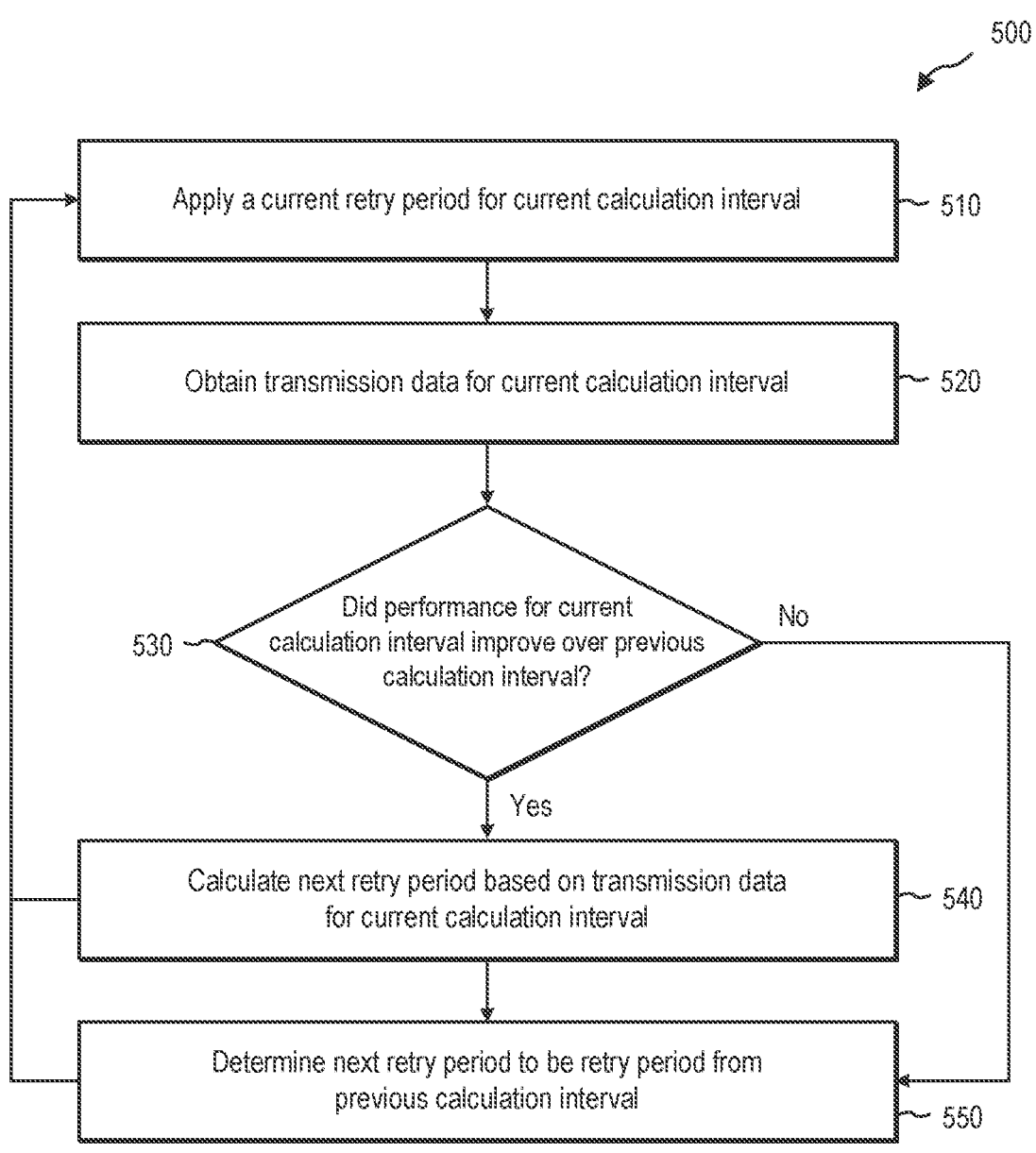
FIG. 5 illustrates an example series of acts for determining and implementing an updated retry period in accordance with one or more embodiments.

Turning now to FIG. 5, this figure illustrates an example flowchart including a series of acts for implementing features and functionalities described herein. While FIG. 5 illustrates acts according to one or more embodiments, alternative embodiments may omit, add to, reorder, and/or modify any of the acts shown in FIG. 5. The acts of FIG. 5 may be performed as part of a method. Alternatively, a non-transitory computer-readable medium can include instructions thereon that, when executed by one or more processors, cause a server device and/or client device to perform the acts of FIG. 5. In still further embodiments, a system can perform the acts of FIG. 5.

Turning now to FIG. 5, this figure illustrates an example flowchart including a series of acts for determining and implementing an updated retry period, as described herein. While FIG. 5 illustrates acts according to one or more embodiments, alternative embodiments may omit, add to, reorder, and/or modify any of the acts shown in FIG. 5. The acts of FIG. 5 may be performed as part of a method. Alternatively, a non-transitory computer-readable medium can include instructions thereon that, when executed by one or more processors, cause a server device and/or client device to perform the acts of FIG. 5. In still further embodiments, a system can perform the acts of FIG. 5.

For example, FIG. 5 illustrates an example series of acts 500 for configuring a network function (e.g., a sending node) in a core network of a telecommunications environment. As described herein, a sending node may implement a current retry policy including a current retry period. The current retry period may correspond to a delay between sending a message to a peer node and sending a retry message to the peer node for the corresponding message. As shown in FIG. 5, the series of acts 500 may include an act 510 of applying a current retry period for a current calculation interval. In one or more embodiments, the current retry period may be an initial or default retry period implemented on the sending node, for example, upon deployment of the sending node on the core network. In one or more embodiments, the current retry period may be a retry period that a communication policy system of the sending node has previously determined and/or updated for one or more communications of the sending node (e.g., from a previous iteration of the series of acts 500).

As further shown in FIG. 5, the series of acts 500 may include an act 520 of obtaining transmission data for the current calculation interval. As described herein, the transmission data may be any information relating to one or more communications transmitted to or from the sending node. For example, the transmission data may include information related to a latency of a transmission. As another example, the transmission data may include information related to successful transmission of a plurality of transmissions to or from the sending node. As described herein, the transmission data may be categorized based on a specific peer, a specific message type, a specific loading level of a peer, any other basis, or combinations thereof.

As further shown in FIG. 5, the series of acts 500 may include an act 530 of deciding whether the performance of the sending node for the current calculation interval improved over the performance of the sending node of the previous calculation interval. For example, as discussed herein, the communication policy system may determine a transmission success percentage and/or a transmission success percentage threshold. In some instances, the act 530 may include determining if the transmission success percentage of the current calculation interval is within the transmission success percentage threshold. For example, the transmission success percentage threshold may be a desired subset or percentage of successfully transmitted messages. The act 530 may include determining whether the percentage of successfully transmitted messages corresponding to the transmission success percentage is within the threshold. In other words, the act 530 may include determining whether a threshold percentage of successfully transmitted messages were transmitted withing the current retry period of the current retry policy.

If the performance of the sending node during the current calculation interval improved compared to the previous calculation interval (e.g., the current retry period captured the desired amount of successfully transmitted messages), the series of acts 500 may proceed to an act 540 of calculating the next retry period (e.g., updated retry period for the next calculation interval) based on the transmission data obtained for the current calculation interval. For example, the updated retry period may be determined based on an amount of time during which a subset of successfully transmitted messages were transmitted within the transmission success percentage threshold, as described herein. The series of acts 500 may then loop back to the act 510 of applying the current retry period, with the configurations determined in act 540 becoming the current configurations for the purposes of act 510.

If the performance of the sending node during the current calculation interval did not improve compared to the previous calculation interval (e.g., the current retry period did not capture the desired amount of the successfully transmitted messages), the series of acts 500 may proceed to an act 550 of determining the next retry period to be the retry period from the previous calculation interval. For example, the communication policy system may determine that the current retry period implemented during the current calculation interval did not improve, or worsened one or more performance indicators for the sending node, and the communication policy system may accordingly determine to implement a previous retry period for the next calculation interval (e.g., the previous retry period is a retry period implemented in the previous calculation interval before the current calculation interval of act 510). The series of acts 500 may then loop back to the act 510 of applying the current retry period, with the configurations determined in act 550 becoming the current configurations for the purposes of act 510.

The following provides an illustrative example of implementing one or more acts of the series of acts 500 by way of an extended example. This example should not be understood as limiting the present disclosure to the embodiment described, but rather is intended to further explain and/or describe the various acts of the series of acts 500. To this end, it may be helpful to conceptualize a current retry period, $P_n$, that is implemented during a current calculation or time interval $T_n$, with corresponding transmission data, $D_n$. A previous retry period, $P_{n-1}$, implemented for a previous calculation interval $T_{n-1}$ has corresponding transmission data $D_{n-1}$. The series of acts 500 may be implemented in order to determine and/or calculate a future or next retry period $P_{n+1}$ (e.g., an updated retry period as discussed herein) for a future or next time interval $T_{n+1}$.

For example, the act 510 may be implemented by applying the retry period $P_n$ for the time interval $T_n$. During, or at the end of the time interval $T_n$, transmission data $D_n$ may be obtained and/or compiled at act 520, corresponding to the performance of the sending node during the time interval $T_n$. At act 530, the transmission data $D_n$ may be compared to the transmission data $D_{n-1}$ to determine if the performance of the sending node for time interval $T_n$ improved in relation to the performance of the sending node for time interval $T_{n-1}$. If the performance improved, the next retry period $P_{n+1}$ may be calculated based on the transmission data $D_n$ at 540 (e.g., using the techniques describe herein). The series of acts 500 may accordingly loop back to act 510 to continue the various acts in relation to a next time interval $T_{n+1}$ with the configurations determined at act 540. Alternatively, if the performance did not improve at 530, the next retry period $P_{n+1}$ may be set to be the retry period $P_{n-1}$. The series of acts 500 may accordingly loop back to act 510 to continue the various acts in relation to the next time interval $T_{n+1}$ with the configurations determined at act 550. In this way, iterations of the series of acts 500 may be implemented any number of times to determine a retry policy $P_{n+1}$ for a time interval $T_{n+1}$, a retry policy $P_{n+2}$ for time interval $T_{n+2}$, and so on.

Turning now to FIG. 6, this figure illustrates an example flowchart including a series of acts for determining and implementing an updated retry policy as described herein. While FIG. 6 illustrates acts according to one or more embodiments, alternative embodiments may omit, add to, reorder, and/or modify any of the acts shown in FIG. 6. The acts of FIG. 6 may be performed as part of a method. Alternatively, a non-transitory computer-readable medium can include instructions thereon that, when executed by one or more processors, cause a server device and/or client device to perform the acts of FIG. 6. In still further embodiments, a system can perform the acts of FIG. 6.

For example, the series of acts 600 may include an act 610 of starting a new policy generation as well as an act 620 of obtaining transmission information. As described herein, a retry policy may include one or more retry periods for any number of categories and/or subcategories of transmission data (e.g., per peer node, per message type, per loading level, etc.) and the series of acts may include an iterative loop that may be performed for each combination of category and/or subcategory, represented by act 630.

The iterative loop may represent or be defined by one or more additional acts represented by acts 631-637. For example, the series of acts 600 may include an act 631 of setting each of a cumulative success percentage, a time unit, and a latency to 0. An act 632 may increment the time units by 1, obtain a success rate for the corresponding time unit, and add that success rate to the cumulative success percentage (e.g., the cumulative success percentage). The series of acts may iterate the act 632 one or more times until it is determined that the cumulative success percentage has surpassed a threshold at 633 (e.g., the transmission success percentage threshold discussed herein).

In one or more embodiments, the series of acts 600 may include an act 634 of determining the next retry period for the corresponding combination of categorization/subcategorization to be the total time units advanced through the iterative loop of acts 632 and 633. Additionally, an act 635 may include adding or otherwise determining a total success rate for the corresponding combination to be the sum of the success rates for all time units during an observation or calculation interval. In one or more embodiments, a retry limit may be determined at act 636 based on a desired success rate, such as that discussed above in connection with FIG. 2. Further, the series of acts 600 may include an act 637 of persisting the configurations determined in the various acts for a subsequent calculation interval. In this way, the series of acts 600 may determine an updated retry period and/or a retry limit for implementation in a retry policy of a sending node as discussed herein.

Figure 7:
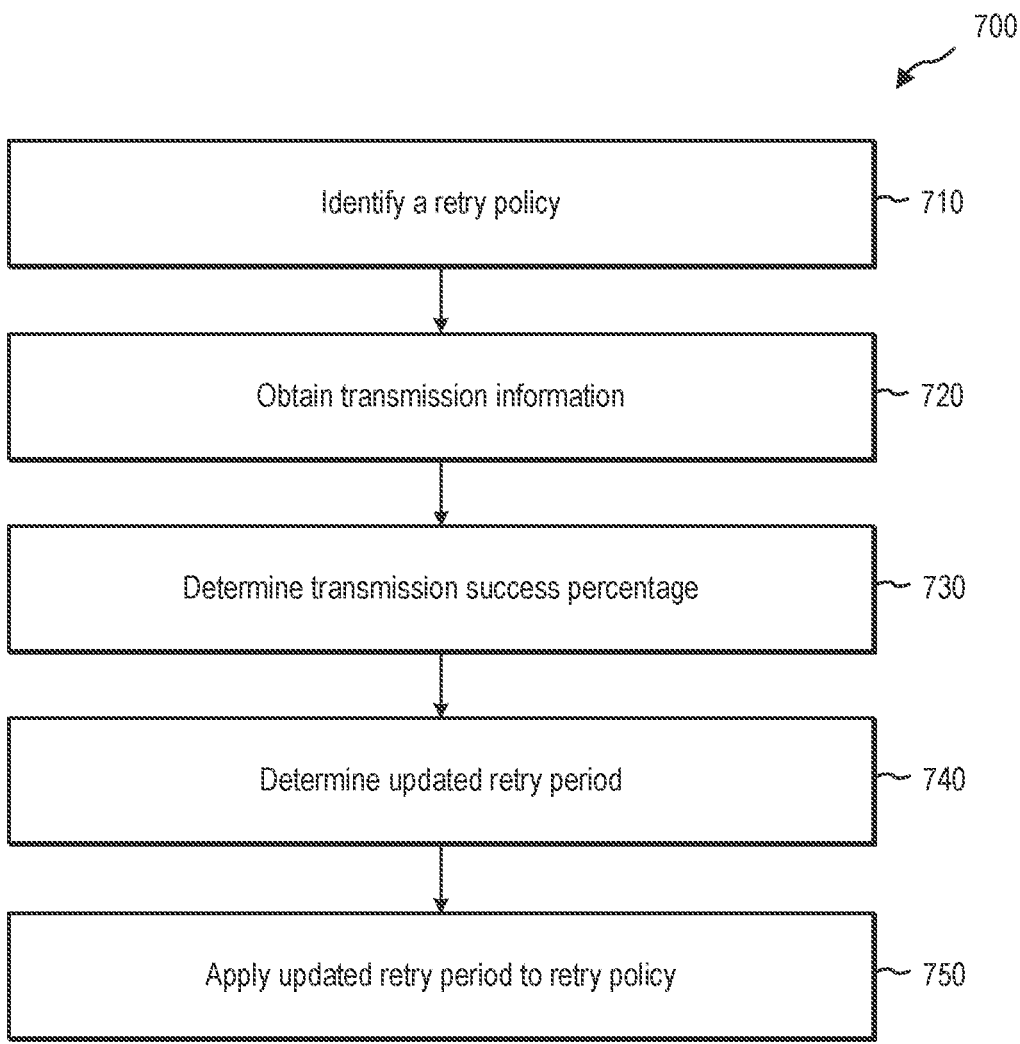
FIG. 7 illustrates an example series of acts for determining and implementing an updated retry policy in accordance with one or more embodiments.

Turning now to FIG. 7, this figure illustrates an example flowchart including a series of acts for determining and implementing an updated retry policy as described herein. While FIG. 7 illustrates acts according to one or more embodiments, alternative embodiments may omit, add to, reorder, and/or modify any of the acts shown in FIG. 7. The acts of FIG. 7 may be performed as part of a method. Alternatively, a non-transitory computer-readable medium can include instructions thereon that, when executed by one or more processors, cause a server device and/or client device to perform the acts of FIG. 7. In still further embodiments, a system can perform the acts of FIG. 7.

For example, FIG. 7 illustrates an example series of acts 700 for configuring a network function in a core network of a telecommunications environment. As shown in FIG. 7, the series of acts 700 may include an act 710 of identifying a retry policy of a sending node. The retry policy may include a retry period associated with sending retry messages from the sending node. In one or more embodiments, the retry period may be implemented as part of the retry period of the sending node for a calculation interval. The calculation interval may be a predetermined length of time less than a timeout interval.

In one or more embodiments, the retry policy may be a first retry policy and the sending node may be a first sending node. The first retry policy may include a first current retry period associated with sending retry messages from the first sending node to a first peer node. In one or more embodiments, the first current retry period may be determined based on one or more of a geographical location of the first sending node, a geographical location of the first peer node, or a wait time protocol of the first peer node. In one or more embodiments, the first sending node is a first network function and the first peer node is a second network function of a same or different type from the first network function. In one or more embodiments, the act 710 may include identifying a second current retry policy for the first sending node. The second retry policy may include a second retry period associated with sending retry messages from the first sending node to a second peer node.

As further shown in FIG. 7, the series of acts 700 may include an act 720 of obtaining transmission data of the sending node. The transmission data may be related to a plurality of communications transmitted by the sending node to a plurality of peer nodes. In one or more embodiments, the plurality of communications may be communications of a first type transmitted by the sending node to the plurality of peer nodes. As discussed herein, the transmission data may be information related to the communications of the first type. In one or more embodiments, the transmission data may include indications of a load of each of the plurality of peer nodes. In one or more embodiments, obtaining transmission data of the sending node with regard to the plurality of communications may include transmission data related to retry messages transmitted by the sending node to the plurality of peer nodes. In one or more embodiments, the act 720 may include obtaining transmission data of the sending node with regard to the plurality of communications transmitted during a calculation interval by the sending node to a plurality of peer nodes. The calculation interval may be a predetermined length of time less than a timeout interval.

In one or more embodiments, the transmission data may be first transmission data of the first sending node. The first transmission data may be related to a first plurality of communications transmitted by the first sending node to the first peer node. The first transmission data may include an indication of a load of the first peer node. In one or more embodiments, the first plurality of communications transmitted by the first sending node to the first peer node is a plurality of communications of a first type, and the first retry policy is associated with sending retry messages of the first type from the first sending node to the first peer node. In one or more embodiments, the act 720 may include obtaining second transmission data of the second sending node. The second transmission data may be related to a second plurality of communications transmitted by the first sending node to the second peer node.

As further shown in FIG. 7, the series of acts 700 may include an act 730 of determining a transmission success percentage. The transmission success percentage may be based on the transmission data and may be associated with the current retry period. For example, the transmission success percentage may represent a percentage of successfully transmitted messages that were transmitted during the current retry period. In one or more embodiments, the act 730 may include determining that that the transmission success percentage associated with the current retry period is less than a transmission success percentage threshold. For example, the transmission success percentage threshold may be a desired percentage or subset of successfully transmitted messages, and the act 730 may include determining that the percentage of successfully transmitted messages that were transmitted during the current retry period is less than the desired threshold. As discussed herein, the transmission data may include indications of a load of each of the plurality of peer nodes. In one or more embodiments, the transmission success percentage may be associated with a peer load level above a threshold load level. For example, the transmission success percentage may represent a percentage of successfully transmitted messages that were transmitted to a subset of peer nodes from the plurality of peer nodes having a load above the threshold load level.

In one or more embodiments, the transmission success percentage may be a first transmission success percentage based on the first transmission data and may be associated with the first current retry period. In one or more embodiments, the act 730 may include determining that the first transmission success percentage associated with the first current retry period is less than a first transmission success percentage threshold. In one or more embodiments, the first transmission success percentage threshold may be at least 99.9% of the first plurality of communications that are successfully transmitted.

In one or more embodiments, the act 730 may include determining a second transmission success percentage. The second transmission success percentage may be based on the second transmission data, and may be associated with the second current retry period. In one or more embodiments, the act 730 may include determining that the second transmission success percentage associated with the second current retry period is less than a second transmission success percentage threshold. In one or more embodiments, the second transmission success percentage threshold may be at least 99.9% of the second plurality of communications that are successfully transmitted. In one or more embodiments, the second transmission success percentage threshold may be the same as the first transmission success percentage threshold. In one or more embodiments, the first and second transmission success percentage thresholds may be different.

As further shown in FIG. 7, the series of acts 700 may include an act 740 of determining an update retry period. The updated retry period may correspond to a subset of the plurality of communications that are successfully transmitted within the transmission success percentage threshold. As discussed herein, the transmission data may be information related to communications of a first type. In one or more embodiments, the act 740 may include determining the updated retry period selectively for sending retry messages of the first type. In one or more embodiments, the updated retry period may be determined selectively for sending retry messages of the first type without modifying one or more retry periods for sending retry messages of other types. As discussed herein, the transmission data may include an indication of a load of each of the plurality of peer nodes. In one or more embodiments, the act 740 may include determining an updated retry period selectively for sending retry messages to peer nodes of the plurality of peer nodes having a load at or above a threshold load level.

In one or more embodiments, the updated retry period may be a first updated retry period, and the first updated retry period may correspond to a subset of the first plurality of communications that are successfully transmitted within the first transmission success percentage threshold. As discussed herein, the first transmission data may include an indication of a load of the first peer node, and the act 740 may include determining the first updated retry period based on the load of the first peer node. In one or more embodiments, the act 740 may include determining a retry limit based on a packet loss rate and a desired loss rate. For example, the retry limit may correspond to an amount of retry messages to send from the first sending node to the first peer node. The packet loss rate may be a packet loss rate of messages of a first type and the desired loss rate may be a desires loss rate of messages of the first type. Accordingly, the retry limit may correspond to an amount of retry messages of the first type to send from the first sending node to the first peer node. In one or more embodiments, the retry limit may be inversely related to an amount of successfully transmitted messages of the first plurality of communications. In one or more embodiments, the act 740 may include determining a second updated retry period. The second updated retry period may correspond to a subset of the second plurality of communications that are successfully transmitted within the second transmission success threshold.

As further shown in FIG. 7, the series of acts 700 may include an act 750 of applying the updated retry period to the retry policy. For example, the retry period may be applied to the retry policy, and the retry policy may be implemented on the sending node to a plurality of future communications transmitted by the sending node to the plurality of peer nodes.

In one or more embodiments, the series of acts 700 may include an act 750 of applying the first updated retry period to the first retry policy. In one or more examples, the act 750 may include applying the second updated retry period to the second retry policy.

Figure 8:
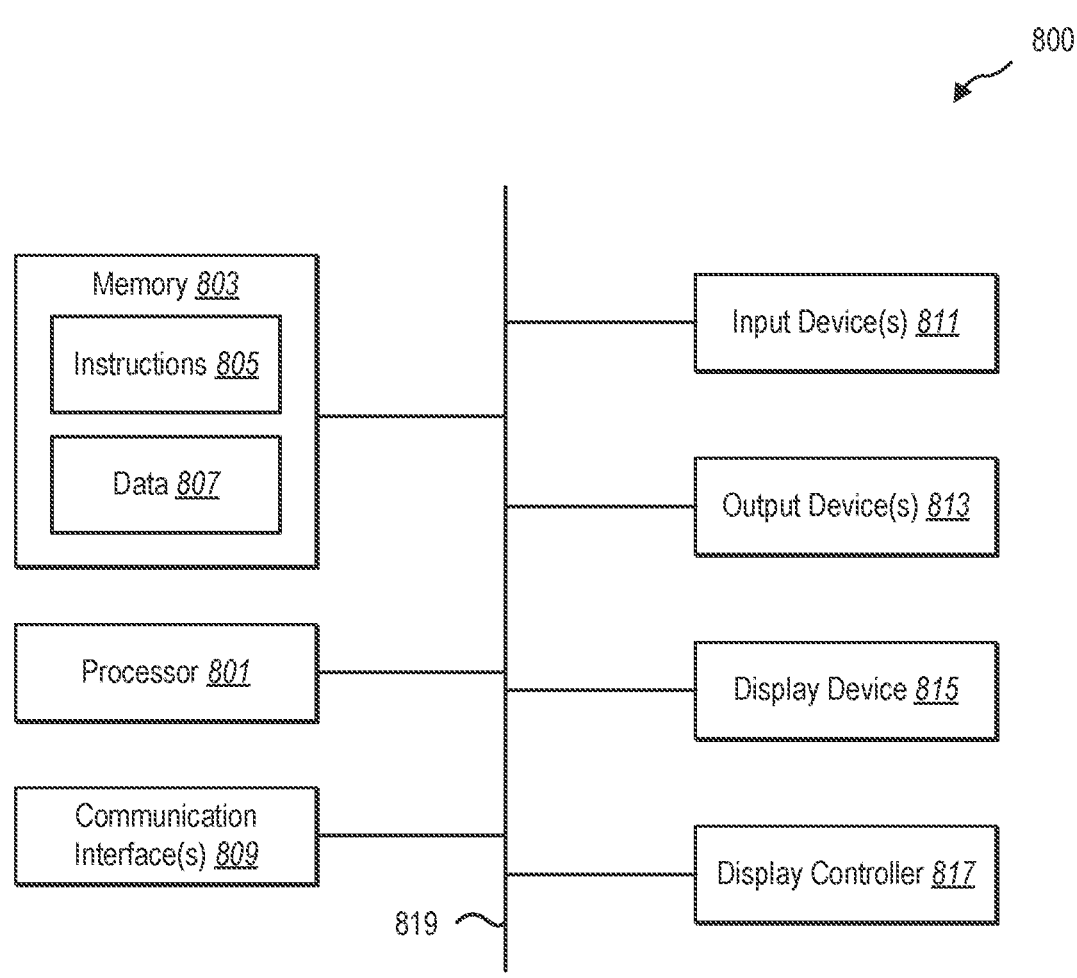
FIG. 8 illustrates certain components that may be included within a computer system.

Turning now to FIG. 8, this figure illustrates certain components that may be included within a computer system 800. One or more computer systems 800 may be used to implement the various devices, components, and systems described herein.

The computer system 800 includes a processor 801. The processor 801 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for configuring a network function in a core network of a telecommunications environment, the method comprising:
  identifying a first retry policy of a network function on a first sending node, the first retry policy including a first current retry period including a first time interval for sending retry messages from the first sending node to a first peer node;
  obtaining first transmission data of the network function associated with a first plurality of communications transmitted by the first sending node to the first peer node;
  determining a first transmission success percentage based on a percentage of the first plurality of communications successfully transmitted from the first sending node to the first peer node;
  determining that the first transmission success percentage associated with the first current retry period is less than a first transmission success percentage threshold;
  determining a first updated retry period including a first updated time interval for sending the retry messages from the first sending node to the first peer node based on a subset of the first plurality of communications that were successfully transmitted within the first transmission success percentage threshold; and
  applying the first updated retry period to the first retry policy of the network function, the first retry policy being applied to a first plurality of future communications transmitted by the first sending node to the first peer node.

2. The method of claim 1, wherein the first transmission data includes an indication of a loading level of the first peer node, and wherein determining the first updated retry period is based on the loading level of the first peer node.

3. The method of claim 1, wherein the first plurality of communications transmitted by the first sending node to the first peer node is a plurality of communications of a first message type, and the first retry policy is associated with sending retry messages of the first message type from the first sending node to the first peer node.

4. The method of claim 1, wherein the first transmission success percentage threshold is at least 99.9% of the first plurality of communications that are successfully transmitted.

5. The method of claim 1, wherein the first current retry period is determined based on one or more of a geographical location of the first sending node or a geographical location of the first peer node.

6. The method of claim 1, further comprising determining a retry limit based on a threshold packet loss rate, the retry limit corresponding to a maximum amount of retry messages to send from the first sending node.

7. The method of claim 6, wherein the threshold packet loss rate is a threshold packet loss rate of messages of a first message type.

8. The method of claim 6, wherein the retry limit is inversely related to an amount of successfully transmitted messages of the first plurality of communications.

9. The method of claim 1, further comprising:
  identifying a second retry policy of the network function, the second retry policy including a second current retry period including a second time interval for sending retry messages from the first sending node to a second peer node;
  obtaining second transmission data of the first sending node associated with a second plurality of communications transmitted by the first sending node to the second peer node;
  determining a second transmission success percentage based on a percentage of the second plurality of communications successfully transmitted from the first sending node to the second peer node;
  determining that the second transmission success percentage associated with the second current retry period is less than a second transmission success percentage threshold;
  determining a second updated retry period including a second updated time interval for sending the retry messages from the first sending node to the second peer node based on a subset of the second plurality of communications that were successfully transmitted within the second transmission success percentage threshold; and
  applying the second updated retry period to the second retry policy of the network function, the second retry policy being applied to a second plurality of future communications transmitted by the first sending node to the second peer node.

10. The method of claim 1, wherein the network function is implemented on a server node within a fifth generation (5G) telecommunication environment.

11. A computer implemented method for configuring a network function in a core network of a telecommunications environment, the method comprising:
  identifying a retry policy of a network function on a sending node, the retry policy including a current retry period including a time interval for sending retry messages from the sending node;
  obtaining transmission data of the sending node associated with a plurality of communications transmitted by the sending node to a plurality of peer nodes;
  determining a transmission success percentage based on a percentage of the plurality of communications successfully transmitted from the sending node to the plurality of peer nodes;
  determining that the transmission success percentage associated with the current retry period is less than a transmission success percentage threshold;
  determining an updated retry period including an updated time interval for sending the retry messages from the sending node to the plurality of peer nodes based on a subset of the plurality of communications that were successfully transmitted within the transmission success percentage threshold; and applying the updated retry period to the retry policy of the network function, the retry policy being applied to a plurality of future communications transmitted by the sending node to the plurality of peer nodes.

12. The method of claim 11, wherein the plurality of communications is a plurality of communications of a first message type transmitted by the sending node to the plurality of peer nodes, and wherein determining the updated retry period includes determining the updated retry period for sending retry messages of the first message type from the sending node.

13. The method of claim 12, wherein determining the updated retry period includes determining the updated retry period selectively for sending retry messages of the first message type without modifying one or more retry periods for sending retry messages of other message types.

14. The method of claim 11, wherein the transmission data includes indications of a loading level of each of the plurality of peer nodes and wherein the transmission success percentage is a percentage of successfully transmitted communications to a subset of peer nodes from the plurality of peer nodes having a loading level above a threshold load level.

15. The method of claim 14, wherein determining the updated retry period includes determining the updated retry period selectively for sending retry messages to peer nodes of the plurality of peer nodes having a loading level at or above the threshold load level.

16. The method of claim 11, wherein obtaining the transmission data includes obtaining transmission data of the sending node with regard to the plurality of communications, including retry messages, transmitted by the sending node to the plurality of peer nodes.

17. The method of claim 11, wherein obtaining transmission data includes obtaining transmission data of the sending node associated with the plurality of communications transmitted during a calculation interval by the sending node to a plurality of peer nodes, the calculation interval falling within a predetermined length of time less than a timeout interval of the network function.

18. A system, comprising:
one or more processors;
a memory in electronic communication with the one or more processors; and
instructions stored in the memory, the instructions being executable by the one or more processors to:
identify a first retry policy of a network function on a first sending node, the first retry policy including a first current retry period including a first time interval for sending retry messages from the first sending node to a first peer node;
obtain first transmission data of the network function associated with a first plurality of communications transmitted by the first sending node to the first peer node;

determine a first transmission success percentage based on a percentage of the first plurality of communications successfully transmitted from the first sending node to the first peer node;
determine that the first transmission success percentage associated with the first current retry period is less than a first transmission success percentage threshold;
determine a first updated retry period including a first updated time interval for sending the retry messages from the first sending node to the first peer node based on a subset of the first plurality of communications that were successfully transmitted within the first transmission success percentage threshold; and
apply the first updated retry period to the first retry policy of the network function, the first retry policy being applied to a first plurality of future communications transmitted by the first sending node to the first peer node.

19. The system of claim 18, the instructions further being executable by the one or more processors to:
identify a second retry policy of the network function, the second retry policy including a second current retry period including a second time interval for sending retry messages from the first sending node to a second peer node;
obtain second transmission data of the first sending node associated with a second plurality of communications transmitted by the first sending node to the second peer node;
determine a second transmission success percentage based on a percentage of the second plurality of communications successfully transmitted from the first sending node to the second peer node;
determine that the second transmission success percentage associated with the second current retry period is less than a second transmission success percentage threshold;
determine a second updated retry period including a second updated time interval for sending the retry messages from the first sending node to the second peer node based on a subset of the second plurality of communications that were successfully transmitted within the second transmission success percentage threshold; and
apply the second updated retry period to the second retry policy of the network function, the second retry policy being applied to a second plurality of future communications transmitted by the first sending node to the second peer node.

20. The system of claim 18, wherein the first plurality of communications transmitted by the first sending node to the first peer node is a plurality of communications of a first message type, and the first retry policy is associated with sending retry messages of the first message type from the first sending node to the first peer node.

* * * * *